Oct. 17, 1933.   G. D. MALLORY   1,930,764
PNEUMATIC TIRE AND METHOD OF MAKING SAME
Filed Nov. 5, 1931   3 Sheets-Sheet 1

Inventor
Gerald D. Mallory

Oct. 17, 1933.    G. D. MALLORY    1,930,764
PNEUMATIC TIRE AND METHOD OF MAKING SAME
Filed Nov. 5, 1931    3 Sheets-Sheet 2
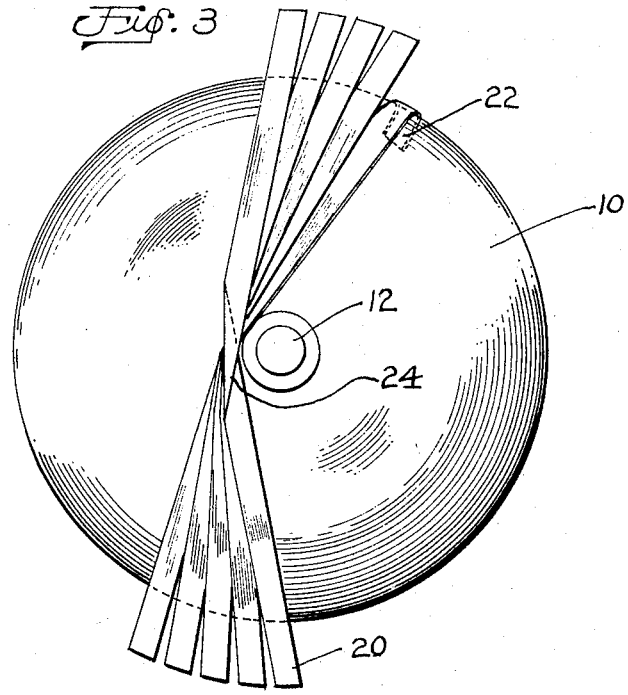
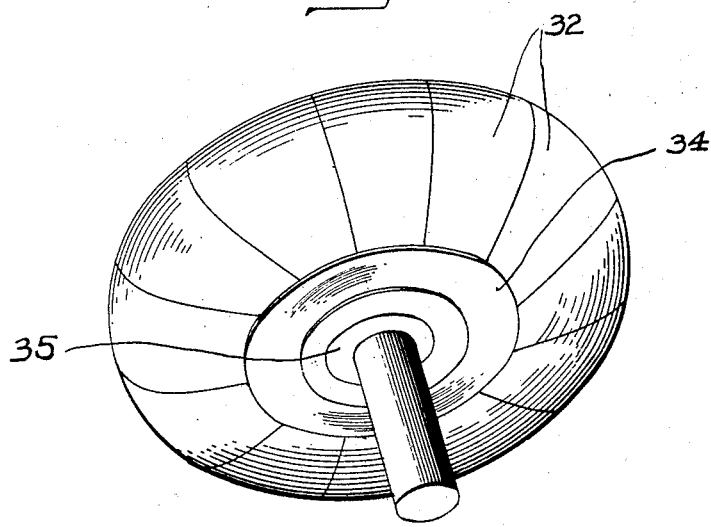
Inventor
Gerald D. Mallory
By
Attorney

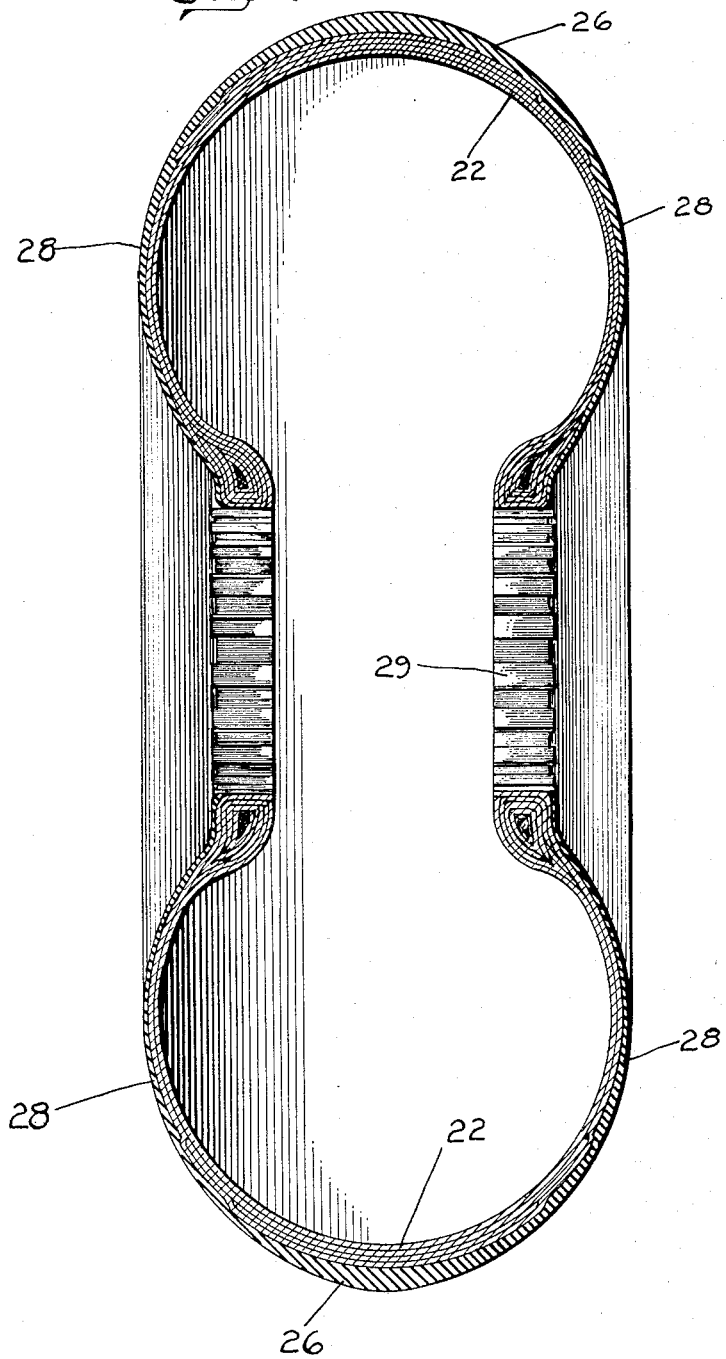

Patented Oct. 17, 1933

1,930,764

UNITED STATES PATENT OFFICE 1,930,764

PNEUMATIC TIRE AND METHOD OF MAKING SAME

Gerald D. Mallory, Akron, Ohio, assignor to Wingfoot Corporation, Wilmington, Del., a corporation of Delaware Application November 5, 1931. Serial No. 573,049

9 Claims. (Cl. 154—14)

This invention relates to pneumatic tires and the method of making the same. It more particularly relates to tires having relatively small bead diameters, but large cross-sectional diameters, and to methods of constructing this type of tires.

Tires of the type comprising the present invention are particularly adapted for use on airplanes, in that the cushioning effects thereof are substantially superior to the ordinary high pressure or balloon tire. These tires are adapted to be mounted directly upon the hub without any supporting wheel structure between the tire and hub.

It has been found that methods ordinarily employed in the construction of high pressure or balloon tires cannot successfully be used in the construction of tires of large cross-sectional areas and small bead diameters. For example, if it is attempted to build a tire of this type upon a flat drum, which is thereafter collapsed and the flat pulley-like tire carcass expanded from the drum size to the size in which it is to be vulcanized, numerous difficulties are encountered. These difficulties include a very perceptible diminishing of the number of cords or the "cord count" for a given distance normally found adjacent the tread portion of the tire. This reduction in the number of cords adjacent the tread portion of the tire substantially weakens the entire tire structure. Moreover, in expanding the tire from the flat pulley shape, it is quite possible that the cords comprising the plies will be broken in places due to the substantial expansion which must be given the flat built tire. All of these difficulties are encountered because the bead diameters of the tires are so small, being in the neighborhood of from one-half inch to twelve inches in the smallest to the largest sizes. When it is realized that the overall diameters of the tires are anywhere from three to sixty inches, or greater, it will be appreciated that numerous and almost unsurmountable difficulties are experienced in attempting to adapt the flat built or crown built methods used in ordinary tire construction to the construction of tires of the dimensions set forth above.

Some attempts have also been made to employ the old core built method to the construction of the proposed type of tires. However, in adapting this method to the construction of such tires many and similar difficulties to those described above are again encountered. In the first place, it is extremely difficult, if not impossible, to remove the ordinary collapsible core from a built up carcass of a tire having relatively large cross-sectional areas but small bead diameters. Again various difficulties result in attempting to apply wide plies of fabric over the core, in that the thickness of the tire carcass at the tread portion is relatively small while the plies tend to form thick wrinkles of material adjacent the beads of the tire.

It has been also proposed to build the carcass of the proposed tire in a flat band shape which is substantially equal in size to the overall diameter of the tire to be produced. Thereafter the sides or edges of the flat band thus constructed are gathered upon split bead rings of the proper diameter, whereby the correct shape of the carcass is obtained. In this method, however, great wrinkles of material result adjacent the bead portions of the tire carcass as in the other methods described. There are numerous other disadvantages resulting from this method, chief of which are the time and cost necessary for manufacture.

It is an object of the present invention to provide a new and improved method for producing tires of relatively large cross-sectional areas but small bead diameters, which avoids the undesirable features of the methods referred to and which is inexpensive, rapid and simple in performance.

Another object is to provide a method of building pneumatic tire casings, wherein the carcass is built up upon a flat disc of a greater diameter than that of the tire to be produced, after which the disc is removed from the carcass, the sides of the carcass are moved relatively apart and the tire is shaped whereby the overall diameter of the carcass is reduced to the proper size.

Another object of the invention is to produce an improved type of low pressure, cushion tire, wherein the cord count for a given distance adjacent the tread portion of the tire is substantially the same as the cord count in the remaining portions of the tire.

Another object of the invention is to provide an improved process for making pneumatic tires, wherein narrow strips of rubberized fabric are continuously wound over a flat building disc in such a manner that a tire carcass is built up.

Another object of the invention is to provide a method of building pneumatic tires wherein strips of rubberized fabric are lapped over a suitable building form so that the ends of the strips extend over opposite sides of the building form and the middle portions of the strips pass with appropriate twists adjacent the bead portion of the tire.

Another object of the invention is to provide a tire of relatively large cross-sectional area, but small bead diameter, wherein the cord angle of the fabric adjacent the bead and throughout the tire carcass is such that stresses in the tire are most successfully taken care of. It has been found that in order to properly distribute and resist the torsional stresses imposed on the tire carcass by the rotation of the tire supporting hub and the transmission of the rotational force thereof to the tread portion of the tire, the cords extending from the beads of the tires to the treads must pass tangentially of the beads. In this manner the torsional forces transmitted from the beads to the tread of the tire are carried directly upon cords extending in as straight lines as possible between the torque producing arm, namely the radius of the bead, and the force applying tread. Tires built by prior known methods have had the cords running substantially radially outwardly from the beads to the tread. The torsion in such construction has been found to produce a distinct relative circumferential movement of the tread with respect to the beads of the tire causing very undesirable strains to be set up in the tire. Moreover, tendency of the tire to split, puncture, stretch or burst is materially reduced by having alternate plies running at opposite angles rather than in the same direction as occurs when the cords extend radially of the beads.

For a better understanding of the invention, reference may now be had to the accompanying drawings, forming a part of the specification, wherein:

Figure 3 is a side elevation of a partially built tire produced by another form of the invention;

Figure 4 is a perspective view of a tire carcass built by another form of the invention; and Figure 5 is a cross-sectional view through a complete doughnut tire constructed in accordance with the invention.

In practicing the present invention, a flat disc like building form 10 is generally provided, which preferably comprises a disc of cardboard, holland or other crushable or flexilbe material, but which may take the form of a collapsible disc, if the bead diameters of the tire carcass being constructed will permit the removal of the disc after collapsing. It is also possible to use a disc-shaped inner tube which can be left inside the tire after the building operation. The disc 10 may be supported or handled in any known manner, but is preferably mounted upon a shaft 12 or the like. It will be understood that the disc 10 is ordinarily of a diameter substantially greater than that of the finished tire carcass to be constructed.

Figure 1:
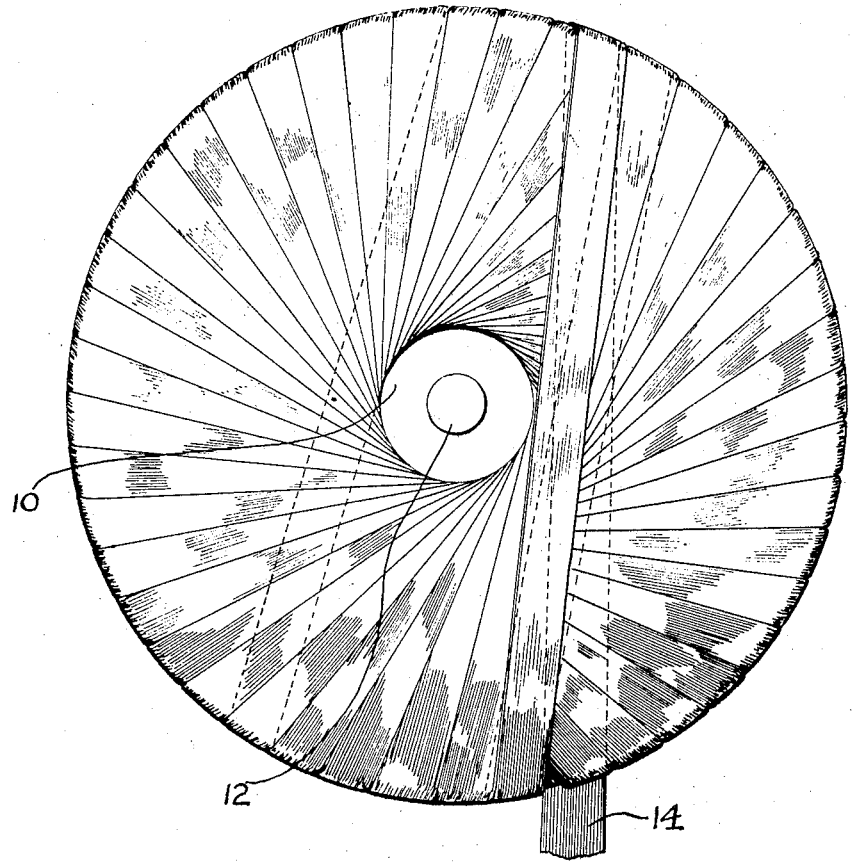
Figure 1 is a side elevation illustrating a partially built tire produced by the method described in the present invention.
Figure 2:
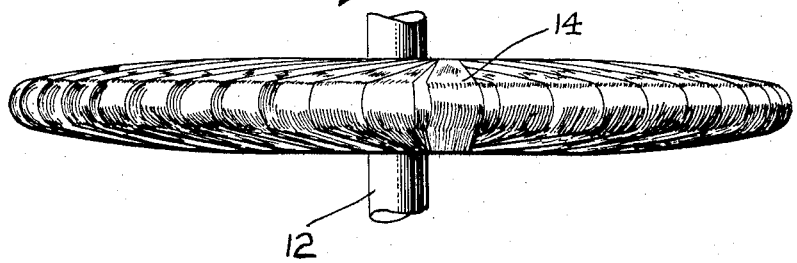
Figure 2 is a plan view of the tire carcass illustrated in Figure 1.

One or more narrow strips of fabric such as indicated at 14 are now wound upon the building disc 10 in the manner illustrated in Figures 1 and 2. It will be seen from these figures that an endless strip can be wrapped continuously around the building disc in such a way that the tire carcass is built up. The convolutions of the strip are overlapped or staggered with respect to each other and are so placed that the midportions of each convolution define the beads or inner periphery of the tire. In this manner any number of plies of material can be built up. It is also possible to reverse the direction of wrapping by merely cutting the strip 14 after one ply has been wound on the disc, and thereafter winding another ply on the disc in the opposite direction, In order to position the strips in just the manner desired a template (not shown) may be employed. In this way the cords can be given the curvature which it has been found works most successfully.

The strips 14 may be formed of any suitable type of rubberized fabric, the cords of which are preferably not cut on the bias, although in certain instances this may be found desirable. It will be seen that the tire carcass is built up somewhat thicker at the bead portions than at the other portions thereof. However, this construction in the present invention is found to give a very desirable added strength at the bead portions of the tire carcass without wrinkling of the fabric at this area as has heretofore been necessary. The invention contemplates adding permanent non-extensible metallic beads to the bead portions of the tire carcass, which beads may be anchored in place through the agency of suitable flipper strips. These beads may be placed in the tire carcass between plies. It has been found however that tires built without the insertion of metal beads stand up quite satisfactorily in service particularly in view of the rather heavy fabric bead portions built up by the present method.

After the tire carcass has been built on the disc 10, the sidewalls and tread portions of the tire may be applied either before or after the disc-like carcass of the tire is shaped. When the tread and sidewalls are applied before the tire carcass is removed from the disc the tread is applied over the periphery of the carcass, which operation may be somewhat facilitated by forming a tread of two or more strips which are joined upon the carcass. The sidewalls are then applied upon the sides of the carcass generally in the form of discs.

The carcass is now removed from the building disc 10 which can be readily accomplished if the disc is of cardboard, by merely crushing or destroying the disc and pulling out the crushed pieces from the interior of the carcass. The carcass is next shaped by inserting a suitable tube or airbag therein, which causes the sides of the carcass to move away from each other, which movement in turn correspondingly reduces the overall diameter of the tire carcass. Inflating the airbag or tube now tends to shape the carcass in the true tire shape.

If the tread and sidewalls have not been applied before the shaping step, they are now applied, and the bead portions of the tire are covered with gum strips and the tire is ready for vulcanization. As set forth herein, the tread and sidewalls may be applied upon the tire carcass before it is removed from the disc. However in the preferred manner of practicing the invention the sidewalls are applied prior to removal from the disc and the tread is applied subsequent to removal and the inflation and shaping of the carcass.

It is well understood that in all prior known methods of flat and crown building of tires the angle made by the cords with the great circle of the tire is decreased when the tire is shaped. As directly distinguished from all prior known results in the present method when the disc-shaped tire carcass is formed the cord angle made with the great circle of the tire increases.

The tire may be vulcanized in any known manner, but preferably is cured in an individual vulcanizer with an airbag or inner tube in the interior of the carcass to properly force it into contact with the walls of the mold.

In the modified form or manner of practicing the method of the present invention, illustrated in Figure 3, strips 20 of narrow fabric are wrapped upon the disc 10 as shown. The ends of each strip 20 are wrapped around the disc 10 as indicated at 22. Each strip is folded once at its middle as at 24, so that any wrinkling or buckling of the fabric adjacent the bead portions of the carcass is eliminated. In this modified method, the strips 20 are placed in offset relation around the entire side of disc 10, after which similar strips are placed in identical manner upon the other side of the disc 10, so that one ply of carcass is formed, which ply is of multi-thickness at the beads, of double thickness ajacent the tread portions and of single thickness at the shoulders of the tire. Any number of plies can be added in a similar fashion. Inextensible metallic bead rings can be mounted between the various plies, as described above, if such bead rings are desired.

The tire illustrated in cross-section in Figure 5 was built up by the method just described and illustrated in Figure 3.

The treads and the sidewalls are applied to the carcass in exactly the same manner as that described above with regard to the continuous strip method of disc building tires. This, of course, may be either before or after the carcass is removed from the disc and shaped. The tread on the carcass illustrated in Figure 5 is indicated by the numeral 26, while the sidewalls are indicated by numeral 28. In tires of the super-balloon type it is customary to provide some means for locking the tires on the supporting hub, and in the tire illustrated in Figure 5 such means comprises a plurality of ribs 29 molded at the bead portions of the tire. The material necessary for the ribs 29 is supplied by the chafer strips applied adjacent the beads and described above.

Figure 5 is illustrative of the relative bead, cross-sectional and overall diameters of the super-balloon type tire which can readily be built by the present disc method.

It will be appreciated that the tire carcass can be built up upon the disc 10 in various ways and that the invention broadly contemplates building a tire carcass in a hollow disc shape in substantially any manner and thereafter shaping the carcass by a lateral separating movement of the sidewalls and bead portions of the tire.

Figure 4 illustrates another manner in which the carcass can be built up. A plurality of double wedge-shaped sections of fabric 32 are folded over the periphery of the disc and down on opposite sides thereof. Suitable discs 34 and 35 of fabric are applied to the sides of the carcass as illustrated and the tire is completed by the application of the tread and sidewalls and by vulcanization in the manner above described.

By the methods described above, it is possible to construct a tire carcass of relatively large cross-sectional and overall diameters which has a comparatively small bead diameter. The tire has superior wear resisting qualities because any stretch applied to the fabric of the tire carcass is more nearly uniform throughout the entire tire. Moreover the cord count at the tread of the tire is undiminished, while wrinkling of the material adjacent the beads has been avoided to a great extent and the overlapping that does occur at this point of the carcass is such that the strength of the tire is materially increased. This is particularly true because the fabric strips comprising the tire carcass run tangentially of the beads of the carcass to the tread whereby the strains transmitted from the hub of the tire to the tread are directly taken up by the strips.

In the method embodying the present invention, the tire carcass is built in a flat disc like shape wherein the overall diameter of the carcass is ordinarily considerably greater than that of the finished tire. The carcass is shaped to the proper contour by moving apart the sides of the carcass. In this manner little or no stretch of the carcass results, and yet the tire can be built to the desired dimensions in a quick and efficient manner.

It will be understood that the fabric utilized in building the tire can be of any known type which may or may not be cut on the bias. The fabric strips can be of any width and can be wound upon the disc 10 so that the offset or staggered convolutions thereof do not overlap the adjacent convolutions but serve to build up a tire carcass by overlapping each other only after a number of convolutions have been wrapped about the disc.

It is also within the concepts of the invention to employ strips of substantially any length and number, which strips may be used only to form the sides of the tire carcass, or which may be wrapped one or more times around the disc 10.

In considering the present invention it should be borne in mind that the foregoing description while particularly referring to building the tire carcass in flat disc shape, also contemplates minor and obvious modifications and attempts to distinguish from the present invention. For example the tire carcass may be built up on a disc of some thickness or upon a double saucer shaped or lenticular form. Again the form may be dumb-bell shaped in cross section or provided with a thickened outer portion, or again the form can be entirely dispensed with.

While the invention is particularly adapted to build ultra-cushion tires of relatively large cross sectional area but small bead diameters, it will be understood that the principles thereof are readily applicable to building pneumatic tires of substantially any shape or size.

Although I have illustrated and described only the preferred embodiment of the invention, it will be apparent to those skilled in the art that the invention is not so limited but that various modifications may be made therein without departing from the spirit of the invention or from the scope of the appended claims.

What I claim is:

1. The method of constructing pneumatic tires which comprises providing a flat disc of crushable material of a greater diameter than the tire to be built, building a tire carcass over the flat disc, crushing and removing the disc from the tire carcass, and shaping the carcass to tire size by moving the sidewalls and bead portions of the carcass apart.

2. The method of building pneumatic tires which comprises providing a flat disc-like building form, winding a continuous strip of fabric around the form in such a manner that each convolution passes only once on both sides of the form and is in offset, overlapped relation with respect to the adjacent convolution, each convolution passing tangentially of the bead circle, removing the building form and shaping the carcass by a lateral separating movement of the bead portions of the tire.

3. The method of building pneumatic tires which comprises providing a flat disc-like building form, winding one or more strips of fabric around the form in such a manner that each strip is in offset, overlapped relation with respect to the adjacent strip, each strip passing tangentially of the bead circle, removing the building form and shaping the carcass by a lateral separating movement of the bead portions of the tire.

4. The method of building pneumatic tires which comprises providing a disc-like building form, winding strips of fabric around the form in such a manner that each convolution passes only once on both sides of the form and is in offset, overlapped relation with respect to the adjacent convolution, removing the building form and shaping the carcass by a laterally apart movement of the bead portions of the tire.

5. That method of making pneumatic tire casing which comprises providing a disc-like building form, applying strips of fabric to one side of the form in staggered overlapping relation, turning the ends of the strips around the form and down on the other side, applying similar strips on said other side of the form which lap around the form and down on the first side, building up any number of plies in this manner and thereafter removing the carcass from the form and shaping it by moving the sidewalls and bead portions of the carcass laterally apart.

6. That method of making a pneumatic tire casing which comprises providing a building form, applying strips of fabric to one side of the form in staggered overlapping relation and turning the ends of the strips around the form and down on the other side, each strip being passed substantially tangentially of the bead circle and being turned back in a half twist upon itself at this point, applying similar strips on said other side of the form which lap around the form and down on the first side, building up any number of plies in this manner and thereafter removing the carcass from the form and shaping it.

7. A pneumatic tire of relatively large cross-sectional and of relatively small bead diameters comprising a carcass built up of a plurality of overlapping, offset convolutions of strips of fabric, each convolution passing only once on each side of the tire, said strips running tangentially of the inner periphery of the tire.

8. A pneumatic tire of relatively large cross-sectional and of relatively small bead diameters comprising a carcass built up of a plurality of strips of fabric, said strips extending in offset, overlapping relation on each side of the tire, each strip being somewhat longer than the overall diameter of the tire and extending around the tread portion of the tire at both ends and at substantially diametrically opposite points, each strip being twisted half over at its midportion and lying substantially tangent to the inner periphery of the beads of the tire.

9. Method of constructing a tire of strips of fabric in which the strips are placed to form a disc-shaped carcass following a path outlined by a template and subsequently shaping the tire and curing it in the desired shape.

GERALD D. MALLORY.